Dec. 27, 1966 R. C. MAXSON 3,293,746
HEDGE TRIMMER
Filed March 22, 1965
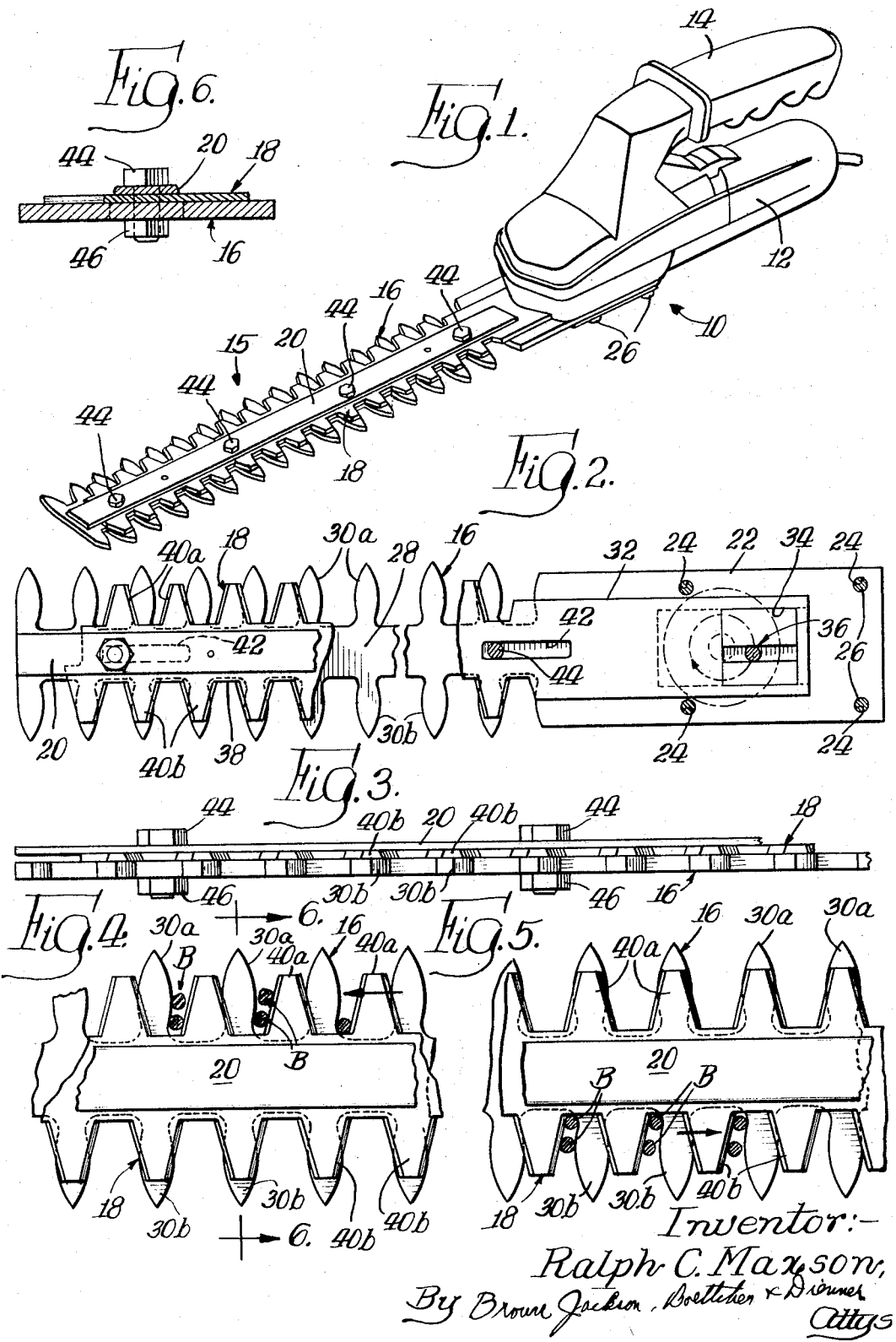
Inventor:—
Ralph C. Maxson,
By Brown, Jackson, Boettcher & Dienner
Attys

United States Patent Office 3,293,746
Patented Dec. 27, 1966

3,293,746
HEDGE TRIMMER
Ralph C. Maxson, Skokie, Ill., assignor to Vermont American Corporation, Louisville, Ky., a corporation of Kentucky
Filed Mar. 22, 1965, Ser. No. 441,763
5 Claims. (Cl. 30—223)

The present invention relates to an electric hedge trimmer of the type having a fixed cutting blade and a movable cutting blade. More specifically, the invention relates to an electric hedge trimmer comprising a fixed cutting blade and a movable cutting blade each having cutting teeth on two opposite longitudinal sides thereof, and wherein drive means is provided for reciprocating the movable blade longitudinally relative to the fixed blade for trimming hedges and the like.

It is known in the art to provide a hedge trimmer with a fixed cutting blade and a movable cutting blade each of which has teeth on opposite side edges thereof. Such hedge trimmers have the advantage of offering a double cutting edge. In such known devices it is customary to arrange the teeth on each of the blades in spaced relation, the teeth on one edge of a blade being in oppositely disposed relation to the teeth on the other edge thereof. Thus, a fixed cutting blade is provided with a plurality of spaced cutting teeth along one longitudinal edge thereof and an equal number of cutting teeth on the opposite longitudinal edge, the latter teeth being in oppositely disposed relation to the first-mentioned teeth so as to render the blade symmetrical about its longitudinal axis. The conventional movable cutting blade has a plurality of teeth formed thereon in the same relationship as described above relative to the fixed blade. Accordingly, in conventional double edge electric hedge trimmers, both the fixed and movable cutting blades are symmetrical, and thus when the teeth on one side of the movable blade are in cutting relation with the teeth on the corresponding side of the fixed blade, the same is true of the teeth on the opposite sides of the movable and fixed blades, even though only one side of the blade assembly is used for cutting at any given time.

One of the principal problems encountered with known hedge trimmers of the type described above relates to interference between the teeth on the fixed and the movable blades on the side opposite to where a trimming operation is being effected. That is, when a given tooth on the movable blade is moving longitudinally toward an adjacent tooth on the fixed blade so as to cut a small branch or the like therebetween, such cutting action creates a force component in a direction perpendicular to the plane of the blades which tends to separate the cutting teeth which normally slide across one another. Such a tendency to separate the fixed and movable cutting teeth on the operative side of the trimmer blade assembly produces the opposite result on the other side which is not engaged in a cutting operation. The forces produced during the cutting operation tend to pivot the movable blade about its longitudinal axis so as to separate the fixed and movable teeth on the cutting side and produce interference between the fixed and movable teeth on the non-cutting side of the blade assembly. Such slight interference between the fixed and moving teeth on the non-cutting side of the blade assembly causes damage to the blades and reduces their cutting efficiency and useful life.

It is an object of the present invention to provide an electric hedge trimmer which avoids the above-mentioned problem and produces increased cutting efficiency and longer blade life.

A more specific object of the invention is to provide an electric hedge trimmer embodying an improved blade assembly wherein the teeth on opposite sides of one of the blades are arranged in a novel offset manner which provides increased bearing support for the movable blade and prevents interference between the teeth on the non-cutting sides of the fixed and movable blades during a trimming operation.

In furtherance of the foregoing object, the teeth on one side of the movable blade are offset from the teeth on the opposite side, while the teeth on the fixed blade are oppositely disposed in the usual manner. Accordingly, when the two blades are working together with the movable blade reciprocating back and forth along the fixed blade, the teeth on one side of the movable blade will be disposed in a cutting position relative to the teeth on the corresponding side of the fixed blade at a time when the teeth on the non-cutting side of the movable blade are in approximate overlying relation to the teeth on the non-cutting side of the fixed blade. It will of course be understood that the amount of the offset of the teeth on one side of the movable blade from the teeth on the opposite side thereof is determined to effect the foregoing relationship.

The purpose of the foregoing arrangement is to provide increased bearing support for the movable blade and thereby support the movable blade against any pivoting movement about its longitudinal axis during a cutting operation and prevent interference between the teeth on the non-cutting sides of the fixed and movable blades respectively. Thus, as the teeth on one side of the movable blade move longitudinally toward the teeth on the corresponding side of the fixed blade to sever branches or the like disposed therebetween, the offset teeth on the non-cutting side of the movable blade are in approximate overlying relation to the teeth on the non-cutting side of the fixed blade. With such an arrangement the teeth on the non-cutting side of the relatively rigid fixed blade support the teeth on the non-cutting side of the movable blade during a cutting operation thereby stabilizing the movable blade and minimizing any possibility of interference between the teeth on the two blades as is normally caused by the forces developed during cutting.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

In the drawings:

FIGURE 1 is a perspective view of an electric hedge trimmer embodying the novel blade combination of the present invention;

FIGURE 2 is an enlarged top plan view, partly broken away, of the blade assembly embodied in the hedge trimmer of FIGURE 1, such assembly comprising a fixed blade, a movable blade, and a support plate for supporting the movable blade relative to the fixed blade;

FIGURE 3 is a side elevational view, partly broken away, of the blade assembly of FIGURE 2;

FIGURE 4 is an enlarged fragmentary top plan view of the blade assembly of FIGURE 2, showing the manner in which the teeth on the non-cutting side of the movable blade are supported by the teeth on the non-cutting side of the fixed blade during a cutting operation;

FIGURE 5 is a view similar to FIGURE 4 showing the opposite sides of the blades being used for a cutting operation; and FIGURE 6 is a transverse sectional view taken substantially along the line 6—6 of FIGURE 4.

Referring now to the drawings, FIGURE 1 shows an electric hedge trimmer 10 comprising a motor housing 12, a handle 14 integral with the motor housing, and a cutting blade assembly 15. The cutting blade assembly 15 includes a fixed blade 16, a movable blade 18, and a longitudinal support plate 20. As shown in FIGURE 2, the fixed blade 16 includes a mounting plate portion 22 at its inner end with openings 24 to accommodate four mounting screws 26 which secure the rear end of the fixed blade to the underside of the housing 12. The forward end of the blade 16 comprises a base portion 28 having a plurality of cutting teeth 30a projecting from one side thereof and a plurality of cutting teeth 30b projecting from the opposite side thereof. It will be seen that each of the cutting teeth 30a is disposed opposite to one of the cutting teeth 30b so as to render the fixed blade 16 symmetrical with respect to the two sets of cutting teeth.

The movable blade 18 includes a plate portion 32 at its inner end having a square opening 34 therein for cooperation with drive mechanism indicated at 36 for reciprocating the blade 18 relative to the fixed blade 16. The forward end of the movable blade 18 comprises a base portion 38 having a plurality of cutting teeth 40a projecting from one side thereof and a plurality of cutting teeth 40b projecting from the opposite side thereof. It will be seen that unlike the teeth on the fixed blade 16, the teeth 40a and 40b are offset from one another. Thus, there are no oppositely disposed teeth on the two cutting sides of the movable blade 18.

The movable blade 18 overlies the fixed blade 16 and is provided with a plurality of longitudinal slots as shown at 42 in FIGURE 2. In the embodiment being described, four such longitudinal slots are provided, and four bolts 44 and nuts 46 are utilized to secure the movable blade 18 between the support plate 20 and the fixed blade 16, the bolts being disposed in the slots 42. Thus, each bolt 44 passes through the longitudinal support plate 20, through one of the slots 42 in the movable blade 18, and through the fixed blade 16, and a nut 46 is secured to the bolt at the underside of the fixed blade 16 as shown in FIGURE 3. The slots 42 permit the movable blade 18 to reciprocate longitudinally between the support plate 20 and the fixed blade 16, and of course the blade assembly 15 must not be clamped so tight as to prevent such reciprocating movement of the blade 18.

Referring now to FIGURE 4, the blade assembly 15 is shown with the blade 18 moving to the left so as to sever a plurality of small branches B disposed between the teeth 30a on the fixed blade 16 and the teeth 40a on the movable blade 18. Since only one side of the blade assembly is utilized in a given cutting operation, it will be understood that when the teeth 30a and 40a are utilized for cutting, the other side of the blade assembly comprising the teeth 30b and 40b will not perform any cutting operation. In FIGURE 4 the teeth 40a as they move to the left are in such a position relative to the teeth 30a that they are about to sever the branches B, and it will be noted that the teeth 40b on the other side of the movable blade are in approximate overlying relation to the teeth 30b on the corresponding side of the fixed blade.

As best shown in FIGURES 3 and 6, the fixed blade 16 is substantially thicker and more rigid than the movable blade 18, and thus with the teeth 30b on the fixed blade disposed beneath the teeth 40b on the movable blade, the fixed blade stabilizes the movable blade and prevents any undesired pivotal movement thereof during the cutting operation. That is, as the teeth 40a cooperate with the teeth 30a to sever the branches B, the force developed during the cutting operation includes a force component perpendicular to the plane of the blades which tends to separate the teeth 30a and 40a and in effect pivot the movable blade 18 about its longitudinal axis. If the movable blade 18 is permitted to pivot in this manner, the teeth 40b will be moved in a direction perpendicular to the plane of the blade 18 toward the plane of the blade 16, thereby producing a slight interference between the moving teeth 40b and the fixed teeth 30b.

It can be seen from FIGURE 4 that the cutting teeth 40a as they begin a cutting operation are moving into a position where they are substantially entirely out of an overlying position relative to the teeth 30a. Accordingly, it will be understood that if the teeth 40b were oppositely disposed on the movable blade 18 from the teeth 40a, the teeth 40b would be substantially entirely out of an overlying position relative to the teeth 30b during the actual cutting operation, and under such conditions it is possible for the blade 18 when subjected to the cutting forces to pivot an amount sufficient to produce a slight interference between the teeth 30b and the teeth 40b. Even slight interference of this type will damage the cutting teeth and substantially shorten the useful life of the blades. On the other hand, with the teeth 40b offset from the teeth 40a so that the teeth 40b are supported by the teeth 30b while the teeth 30a and 40a are engaged in a cutting operation, the movable blade 18 is stabilized by the heavier fixed blade 16 during a cutting operation, and the possibility of any interference between the cutting teeth is greatly minimized.

It will be understood that the stabilization of the movable blade 18 by the fixed blade 16 in accordance with the present invention will occur regardless of the direction of longitudinal movement of the blade 18 and regardless of the side of the blade assembly being utilized for a cutting operation. FIGURE 5 shows the blade 18 moving toward the right with the lower side of the blade about to carry out a cutting operation. Thus, the teeth 40b on the movable blade 18 are moving to the right toward the teeth 30b on the fixed blade 16 to sever a plurality of small branches B disposed therebetween, and as the cutting operation is about to be initiated the teeth 40a on the non-cutting side of the blade 18 are in approximate overlying relation to the teeth 30a on the corresponding side of the fixed blade 16. Accordingly, the movable blade 18 is stabilized by the fixed blade 16 in the manner described above with reference to FIGURE 4.

It is important to note that since the principal object of the present invention is to provide bearing support during a cutting operation for the teeth on the non-cutting side of the movable blade 18, the amount by which the teeth 40a are offset from the teeth 40b on the opposite side of the blade 18 is determined so that during a cutting operation the teeth on the non-cutting side of the blade will be in approximate overlying relation to the teeth on the corresponding side of the fixed blade 16, substantially as shown in FIGURES 4 and 5. In the particular embodiment being described, the distance between adjacent teeth on the movable blade 18 is 0.750 inch, and the teeth 40a on one side of the blade are offset from the teeth 40b on the other side of the blade by 0.220 inch. Thus, the offset is slightly less than one-third of the spacing between adjacent teeth.

It should further be noted that if desired the teeth 30a and 30b on the fixed blade 16 may be offset from one another, in which case the teeth 40a and 40b on the movable blade 18 may be oppositely disposed to one another in conventional manner. Accordingly, it is the object of the invention to provide two blades in combination, one being a movable blade and the other a fixed blade, with one of the blades having oppositely disposed teeth as described, and the other having offset teeth as described.

While I have illustrated my invention in a preferred form, I do not intend to be limited to that form, except insofar as the appended claims are so limited, since modifications coming within the scope of my invention will be readily suggested to others with my disclosure before them.

I claim:

1. In a hedge trimmer or the like of the type having drive means for reciprocating one cutting blade relative to another to perform a cutting operation, the improvement comprising a blade assembly including, in combination, a first cutting blade having a first set of cutting teeth spaced along one longitudinal edge thereof and a second set of cutting teeth spaced along an opposite longitudinal edge thereof, the cutting teeth of said second set being in oppositely disposed relation to the cutting teeth of said first set, a second cutting blade having a third set of cutting teeth spaced along one longitudinal edge thereof and a fourth set of cutting teeth spaced along an opposite longitudinal edge thereof, the cutting teeth of said fourth set being in offset relation to the cutting teeth of said third set, and means for mounting said first and second blades in overlying relation for relative longitudinal movement to effect a cutting operation.

2. In a hedge trimmer or the like of the type having drive means for reciprocating one cutting blade relative to another to perform a cutting operation, the improvement comprising a blade assembly including, in combination, a first cutting blade having a first set of cutting teeth spaced along one longitudinal edge thereof and a second set of cutting teeth spaced along an opposite longitudinal edge thereof, the cutting teeth of said second set being in oppositely disposed relation to the cutting teeth of said first set, a second cutting blade having a third set of cutting teeth spaced along one longitudinal edge thereof and a fourth set of cutting teeth spaced along an opposite longitudinal edge thereof, the cutting teeth of said fourth set being in offset relation to the cutting teeth of said third set, one of said cutting blades comprising a fixed blade and the other of said cutting blades comprising a movable blade, and means for mounting said first and second blades in overlying relation to permit longitudinal reciprocating movement of said movable blade relative to said fixed blade to effect a cutting operation.

3. In a hedge trimmer or the like of the type having drive means for reciprocating one cutting blade relative to another to perform a cutting operation, the improvement comprising a blade assembly including, in combination, a fixed cutting blade having a first set of cutting teeth spaced along one longitudinal edge thereof and a second set of cutting teeth spaced along an opposite longitudinal edge thereof, the cutting teeth of said second set being in oppositely disposed relation to the cutting teeth of said first set, a movable cutting blade having a third set of cutting teeth spaced along one longitudinal edge thereof and a fourth set of cutting teeth spaced along an opposite longitudinal edge thereof, the cutting teeth of said fourth set being in offset relation to the cutting teeth of said third set, and means for mounting said fixed and movable blades in overlying relation to permit longitudinal reciprocating movement of said movable blade relative to said fixed blade to effect a cutting operation.

4. In a hedge trimmer or the like of the type having drive means for reciprocating one cutting blade relative to another to perform a cutting operation, the improvement comprising a blade assembly including, in combination, a first cutting blade having a first set of cutting teeth spaced along one longitudinal edge thereof and a second set of cutting teeth spaced along an opposite longitudinal edge thereof, the cutting teeth of said second set being in oppositely disposed relation to the cutting teeth of said first set, a second cutting blade having a third set of cutting teeth spaced along one longitudinal edge thereof and a fourth set of cutting teeth spaced along an opposite longitudinal edge thereof, the cutting teeth of said fourth set being in offset relation to the cutting teeth of said third set, and means for mounting said first and second blades in overlying relation for relative longitudinal movement to effect a cutting operation, said first and third sets of teeth being disposed for cooperation to effect a cutting operation at one side of said blade assembly and said second and fourth sets of teeth being disposed for cooperation to effect a cutting operation at the opposite side of said blade assembly, and the amount of said offset being such that when said first and third sets of teeth are engaged in a cutting operation said second and fourth sets of teeth will be in approximate overlying relation to one another.

5. In a hedge trimmer or the like of the type having drive means for reciprocating one cutting blade relative to another to perform a cutting operation, the improvement comprising a blade assembly including, in combination, a first cutting blade having a first set of cutting teeth spaced along one longitudinal edge thereof and a second set of cutting teeth spaced along an opposite longitudinal edge thereof, a second cutting blade having a third set of cutting teeth spaced along one longitudinal edge thereof and a fourth set of cutting teeth spaced along an opposite longitudinal edge thereof, the cutting teeth of said fourth set being in offset relation to the cutting teeth of said third set, and means for mounting said first and second blades in overlying relation for relative longitudinal movement to effect a cutting operation, said first and third sets of teeth being disposed for cooperation to effect a cutting operation at one side of said blade assembly and said second and fourth sets of teeth being disposed for cooperation to effect a cutting operation at the opposite side of said blade assembly, and the amount of said offset being such that when said first and third sets of teeth are engaged in a cutting operation said second and fourth sets of teeth will be in approximate overlying relation to one another.

References Cited by the Examiner
UNITED STATES PATENTS

| 360,374 | 3/1887 | Clough. |
| 660,281 | 10/1900 | Traphagen. |
| 3,193,925 | 7/1965 | Hawley _____ 30—223 X |

WILLIAM FELDMAN, *Primary Examiner.*

J. C. PETERS, *Assistant Examiner.*